United States Patent
Caliendo

(10) Patent No.: US 12,064,722 B2
(45) Date of Patent: Aug. 20, 2024

(54) FILTER SYSTEM

(71) Applicant: Caterpillar Inc., Peoria, IL (US)

(72) Inventor: Vincent P. Caliendo, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 368 days.

(21) Appl. No.: 17/452,214

(22) Filed: Oct. 25, 2021

(65) Prior Publication Data

US 2023/0130601 A1  Apr. 27, 2023

(51) Int. Cl.
*B01D 46/64* (2022.01)
*B01D 46/00* (2022.01)
*B01D 46/24* (2006.01)
*F02M 35/024* (2006.01)

(52) U.S. Cl.
CPC ......... *B01D 46/64* (2022.01); *B01D 46/0002* (2013.01); *B01D 46/24* (2013.01); *B01D 46/2414* (2013.01); *F02M 35/02483* (2013.01); *B01D 2265/028* (2013.01); *B01D 2279/60* (2013.01)

(58) Field of Classification Search
CPC  B01D 46/64; B01D 46/0002; B01D 46/2414; B01D 2271/027; B01D 2265/028; F02M 35/02483
See application file for complete search history.

(56) References Cited

U.S. PATENT DOCUMENTS

| | | | |
|---|---|---|---|
| 5,730,769 A | 5/1998 | Dungs et al. | |
| 5,893,937 A * | 4/1999 | Moessinger | B01D 46/4272 55/505 |
| 6,425,930 B1 | 7/2002 | Wake et al. | |
| 6,602,308 B1 * | 8/2003 | Carle | F02M 35/024 55/482 |
| 8,753,415 B2 | 6/2014 | Coulonvaux et al. | |
| 9,346,001 B2 | 5/2016 | Kato et al. | |
| 10,668,421 B2 | 6/2020 | Zinic et al. | |
| 10,717,033 B2 | 7/2020 | Panni et al. | |
| 10,835,850 B2 | 11/2020 | Osendorf et al. | |
| 2002/0073665 A1 * | 6/2002 | Gieseke | B01D 46/64 55/482 |
| 2002/0152732 A1 * | 10/2002 | Kallsen | B01D 46/2414 55/482 |
| 2020/0406181 A1 | 12/2020 | Corvec et al. | |

FOREIGN PATENT DOCUMENTS

| | | |
|---|---|---|
| EP | 3231498 | 10/2017 |
| EP | 3756746 | 12/2020 |
| JP | 2001286715 A * | 10/2001 |
| WO | 2006026241 | 3/2006 |

OTHER PUBLICATIONS

Machine translation of JP 2001-286715 (Year: 2001).*
Written Opinion and International Search Report for Int'l. Patent Appln. No. PCT/US2021/063177, mailed Jan. 25, 2023 (11 pgs).

* cited by examiner

Primary Examiner — Robert Clemente

(57) ABSTRACT

Systems and methods for coupling filter elements to at least one flange extending inside a housing are disclosed. In one aspect, a filter system may include a housing having an inlet, an outlet, a first end, a second end, a sidewall extending between the first end and the second end, a longitudinal centerline, and at least one flange extending inside the housing; and a plurality of filter elements located inside the housing, the plurality of filter elements each including an end shaped to couple directly to the at least one flange.

16 Claims, 4 Drawing Sheets

FILTER SYSTEM

TECHNICAL FIELD

The present disclosure relates generally to internal combustion engine systems, and more particularly, to a filter system of an internal combustion engine system.

BACKGROUND

Air filters may act as a barrier between the outside air filled with contaminants and the sensitive interior of the internal combustion engine. These air filters need to be securely sealed to the housing to prevent air leakage and displacement during engine operation, e.g., air filters may be held against each other by a compressive force provided by the housing. An accurate sealing of the air filters to the housing may also prevent dust-laden outside air from entering the sensitive interior of the internal combustion engine. However, depending on the configuration of the components of the filter system, it may be difficult to provide a sufficiently air-tight sealing. For example, a radial seal utilized for sealing filter elements to a filter housing may have a limited sealing surface and may provide uncertainty in sealing. The efficiency of the air filters characterizes the quantity and the dimensions of dust particles that may pass through the air filters, and may cause engine wear resulting in performance loss, increased exhaust emissions, higher maintenance and operation cost, or premature engine failure.

A separation apparatus for separating oil from gas is disclosed in U.S. Pat. No. 10,668,421 B2 ("the '421 patent") to Zinic issued on Jun. 2, 2020. The air/oil separation apparatus includes a housing enclosing a filter element. The housing includes a housing cover which is attached to a fastening section for securing to a stationary connection nipple. This fastening section of the housing includes an annular seal having a curved cross-section. However, the '421 patent does not disclose a system for coupling or removing the filter elements from the housing.

The disclosed filter assembly may solve one or more problems of the systems described above and/or other problems in the art. The scope of the current disclosure, however, is defined by the attached claims, and not by the ability to solve any specific problem.

SUMMARY

In one aspect, a filter system may include a housing having an inlet, an outlet, a first end, a second end, a sidewall extending between the first end and the second end, a longitudinal centerline, and at least one flange extending inside the housing; and a plurality of filter elements located inside the housing, the plurality of filter elements each including an end shaped to couple directly to the at least one flange.

In another aspect, a filter assembly may include a first filter element having a first outlet end including a first opening; a second filter element having a second outlet end including a second opening; and the first and second outlet ends of the first and second filter elements include coupling surfaces having complementary shapes.

In a further aspect, a filter assembly may include a first cylindrical filter element having a first outlet end including a first opening; a second cylindrical filter element having a second outlet end including a second opening, wherein the first filter element is sized to be located within the second filter element; and the first and second outlet ends of the first and second filter elements include coupling surfaces having complementary C-shapes, wherein the complementary shapes are located about a radially inner surface of the first opening of the first filter element, and located on a radially outer surface of the second outlet end of the second filter element.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
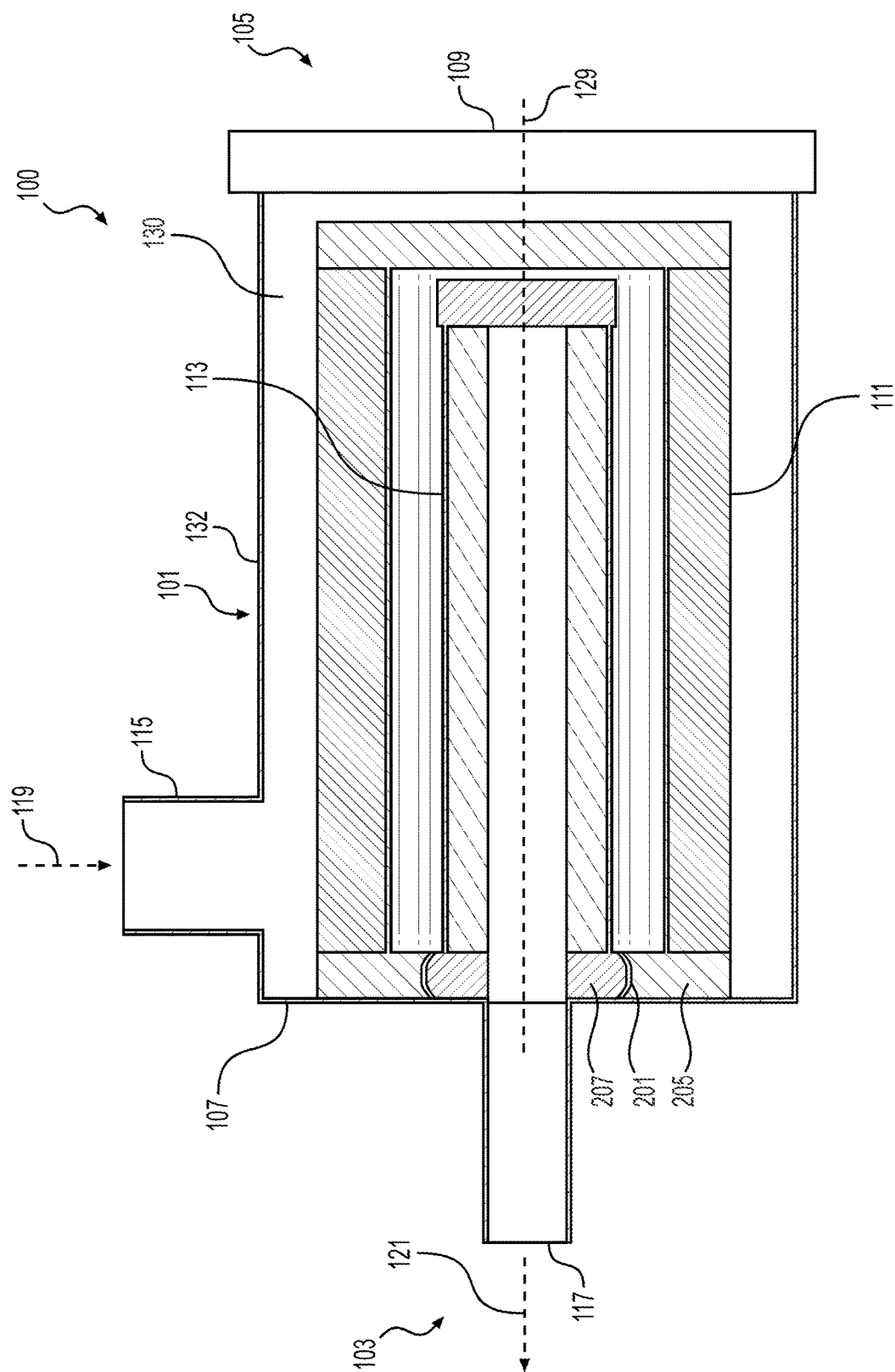
FIG. 1 is a cross-sectional view of an exemplary filter assembly, according to aspects of the present disclosure.

FIG. 1 illustrates a cross-sectional view of an exemplary filter system 100, according to one or more embodiments. Filter system 100 may include a housing 101 including an air inlet 115 and air outlet 117. Air inlet 115 includes an aperture or port extending through housing 101 for providing air flow communication with an interior 130 of housing 101. For example, intake air 119 may pass through air inlet 115 into the interior 130 of housing 101, and then through a radially outer filter element 111, and a radially inner filter element 113 to filter the contaminants. Filtered air 121 may exit the interior of housing 101 through air outlet 117. In one instance, air outlet 117 may include an aperture or port extending through a first end wall 107 of housing 101, and may communicate with a compressor (not shown) of a turbocharger (not shown) of the internal combustion engine. It should be noted that the filter system 100 may be used in a variety of applications without any limitation. The environments and applications of the filter system described herein are exemplary and do not limit the scope of the present disclosure.

The housing 101 of filter system 100 may include a sidewall 132 extending between a first, proximal, end 103, and a second, distal, end 105 opposite the first end 103. While the housing 101 is illustrated as generally cylindrical, the housing may have alternative shapes. First end 103 with first end wall 107 may include air outlet 117. First end wall 107 may be formed integral with, or otherwise not removable from sidewall 132 of housing 101. However, it is understood that first end wall 107 may be removable from the rest of the housing 101 if desired. Second end 105 of housing 101 may include a second end wall 109. Second end wall 109 may include a removable cover, cap, or the like for providing access to the interior 130 of housing 101.

As discussed in more detail below, second end wall 109 may be removed to insert or replace a plurality of air filter elements, e.g., first filter element 111 and second filter element 113, within housing 101. Filter elements 111 and 113 may include any filter material known in the art, e.g., a pleated paper material or the like for filtering particulates, e.g., dust or soot, from the intake air. Filter elements 111 and 113 may have a cylindrical shape, however, it is understood that these filter elements may include any other shapes as desired. In one instance, filter elements 111 and 113 may include end walls opposite their respective outlet ends. As will be described in more detail below, filter elements 111 and 113 may include proximal outlet ends including a proximal base 205 of first filter element 111, and a proximal base 207 of second filter element 113.

Figure 2:
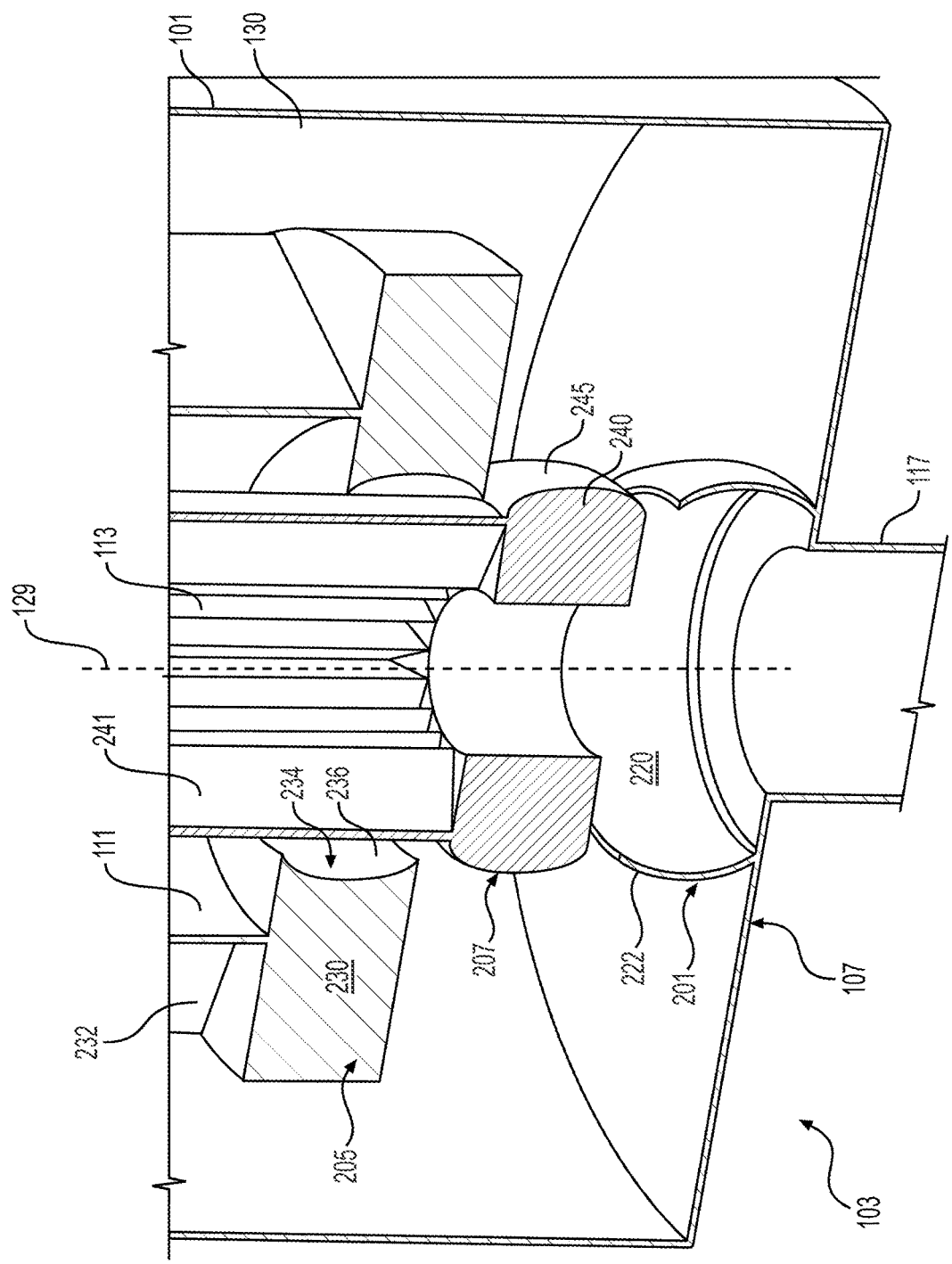
FIG. 2 is a sectional view of a filter coupling portion of the filter assembly of FIG. 1 prior to filter coupling.

FIG. 2 illustrates a sectional view of the proximal or outlet end 103 of housing 101. An internal sidewall of first end wall 107 may include a filter support or coupling member in the form of a flange 201. Flange 201 may be shaped, sized, and configured to receive and support both filter elements 111 and 113, and is located adjacent to air outlet 117 of housing 101. For example, flange 201 may surround outlet 117 and extend integrally from the interior surface of first end wall 107, or may be attached by any means to the interior of first end wall 107. In one instance, flange 201 is a single annular flange extending distally from the interior surface of first end wall 107 and may have a curved shape, such as the C-shape shown. The radially inner surface 220 of flange 201 may have a concave profile as viewed from longitudinal centerline 129 of housing 101. Also, the radially outer surface 222 of flange 201 may have a concave profile as viewed from longitudinal centerline 129 of housing 101. In one instance, flange 201 may be formed to a height of approximately 25 millimeter (mm) to 65 mm, a width of approximately 40 mm to 250 mm, a diameter of approximately 40 mm to 250 mm, and the inner and outer surfaces 220, 222 may have a radius of curvature of approximately 15 mm to 150 mm.

Still referring to FIG. 2, proximal base 205 of first filter elements 111 includes an annular body 230 and a filter media 232 extending distally therefrom. Annular body 230 includes a central opening 234 forming a coupling surface 236 for attaching to flange 201 of housing 101. The coupling surface 236 of annular body 230 may be shaped to match (be substantially similar to), or be shaped complementary to, the shape of radially outer surface 222 of flange 201. For example, the coupling surface 236 of annular body 230 shown in FIG. 2 matches the shape of outer surface 222 of flange 201 by having a concave, C-shape as viewed from the longitudinal centerline 129 of the filter housing 101. As used herein, a substantially similar or matching shape is one that is substantially the same shape along the flange 201, whereas a "complementary" shape is one that may be matching, but does not necessarily have to match, but does allow for engagement and securement with flange 201. For example, coupling surface 236 of annular body 230 could include an alternative, complementary shape (not shown) such as a concave shape on a proximal half of coupling surface 236, and a planar surface on a distal half of coupling surface 236. Such an alternative shape would be "complementary" by allowing engagement with flange 201, but would not be matching because the coupling surface 236 would be a different shape at a distal portion of flange 201.

Also in FIG. 2, proximal base 207 of second filter element 113 includes an annular body 240 and a filter media 241 extending distally therefrom. Annular body 240 includes an outer radial surface forming a coupling surface 245 for attaching to flange 201 of housing 101. The coupling surface 245 of annular body 240 may match (be shaped substantially similar to), or be shaped complementary to, the shape of radially inner surface 220 of flange 201. For example, as shown in FIG. 2, the shape of coupling surface 245 may match the shape of inner surface 220 of flange 201 and include a concave, C-shape as viewed from the longitudinal centerline 129 of the filter housing 101. Further, the inner surface 220 and outer surface 222 of flange 201 have matching shapes, i.e., concave, C-shapes, and accordingly the coupling surfaces 236 and 245 of filter elements 111, 113 have matching shapes, i.e., concave, C-shapes.

Figure 3:
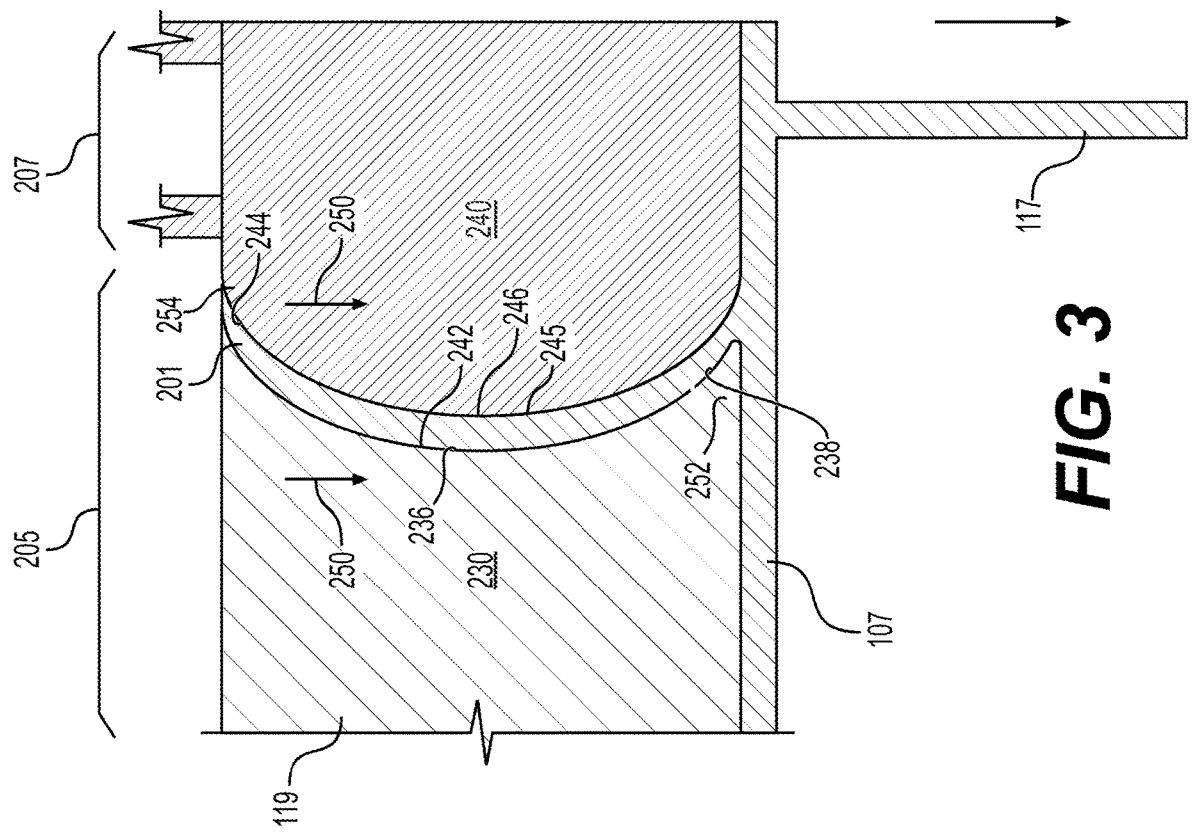
FIG. 3 is an enlarged view of the filter coupling portion of FIG. 2.

FIG. 3 illustrates an enlarged view of the coupling assembly of filter elements 111 and 113 to flange 201. Arrows 250 represent movement of the filter elements 111, 113 along the flange 201 during the filter coupling process. The coupling may provide for a "snap-fit" connection. As used herein, a "snap-fit" connection or coupling includes a coupling where a portion of one coupling surface is smaller than a larger portion of the other coupling surface so that during the coupling process the smaller portion needs to move past the larger portion by way of deformation of one or both of the smaller or larger portions of the coupling surfaces. For example, as shown in FIG. 3, annular body 230 of filter element 111 includes coupling surface 236 having a radially smaller portion 238 (measured from longitudinal centerline 129) that needs to move past a radially larger portion 242 of outer surface 222 of flange 201. Similarly, inner surface 220 of flange 201 includes a radially smaller portion 244 that a radially larger portion 246 of surface 245 needs to move past during coupling of the filter element 113 to flange 201. In such a coupling assembly, restraining portions are located at opposite ends of the flange 201. In particular, a first restraining portion 252 is formed at proximal end of flange 201 for the annular body 230 of filter element 111, and a second restraining portion 254 is formed at a distal end of the flange 201 for the annular body 240 of filter element 113. Thus, the flange 201 provides for opposed or oppositely located restraining portions for the filter elements 111, 113.

The annular bodies 230, 240 and flange 201 may be made of a flexible material to allow for the required deformation when coupling the filter elements 111, 113 to the flange 201. In one instance, flange 201 and proximal bases 205 and 207 may be formed of Ethyl carbamate, Carbamate, or Polyurethane. It is understood that flange 201 and proximal bases 205 and 207 may include any other materials known in the art. For example, flange 201 may be formed of ultra-strong molded pliable rubber that absorbs vibration and allows for secure attachment.

While the exemplary embodiment depicts flange 201 and proximal bases 205 and 207 as having concave, C-shaped coupling surfaces, however, it is understood that flange 201 and proximal bases 205 and 207 may be formed in alternative designs. For example, the curve could be switched and the surfaces can be oppositely oriented, i.e., convex with respect to the longitudinal centerline 129. The flange 201 may be segmented rather than fully annular. Flange 201 may form a distally pointing arrow, and coupling surfaces 236 and 245 may have a complementary shape including a step to allow an underside surface of the arrow to secure the proximal bases 205 and 207. In another alternative, and as reference above, coupling surface 236 and 245 could complementary shapes to flange 201, and include only partially curved portions, for example, only at restraining portions 252 and 254.

Figure 4:
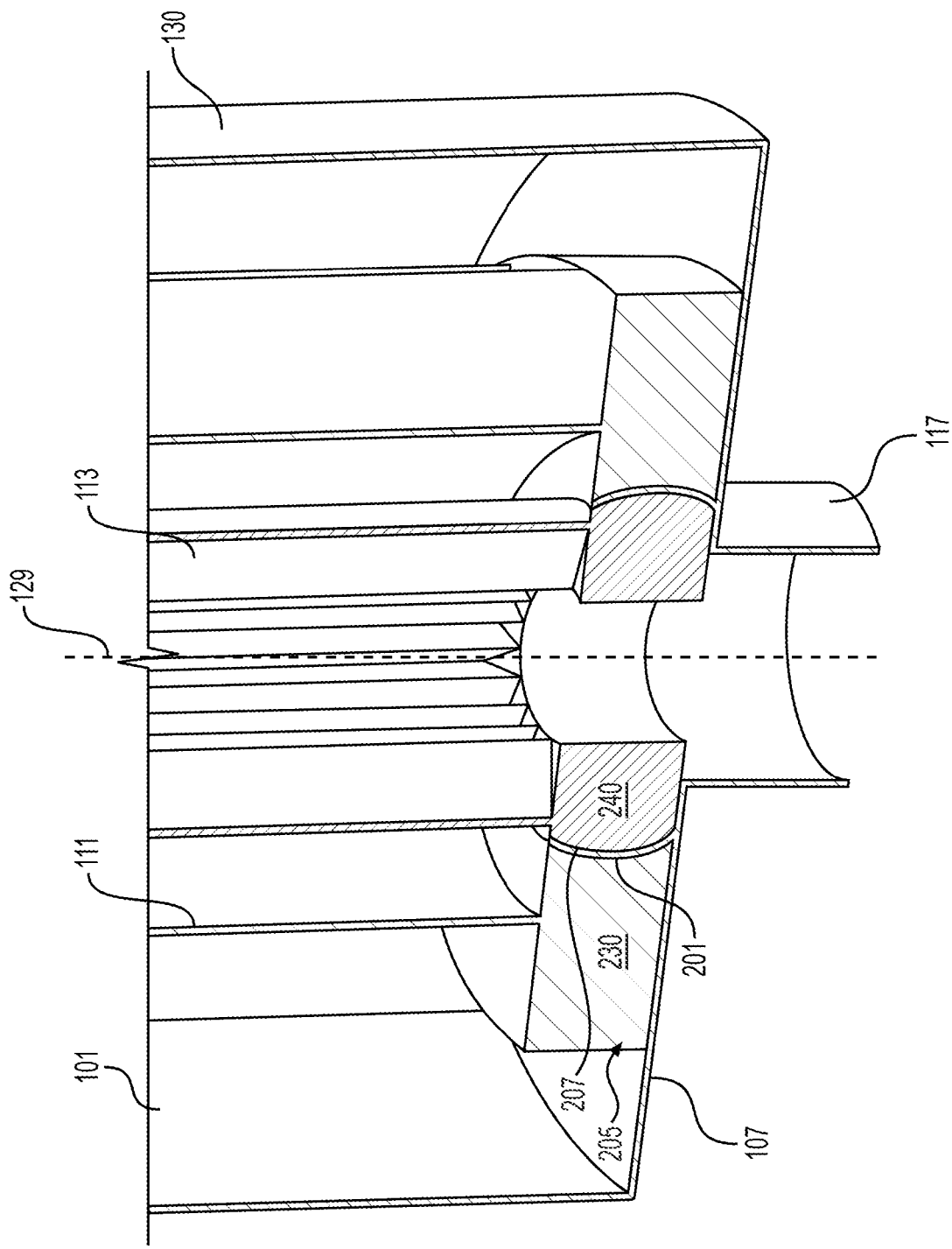
FIG. 4 is a sectional view of a filter coupling portion of the filter assembly of FIG. 1 after filter coupling.

FIG. 4 illustrates proximal end 103 with the filter elements 111, 113 connected to flange 201 of housing 101. As shown, flange 201 is located between proximal bases 205 and 207, and bases 205 and 207 are overlapping and coextensive in a proximal-distal direction.

INDUSTRIAL APPLICABILITY

The disclosed filter system 100 may be employed in any air filter, for example, in air filters of an internal combustion engine. The disclosed filter system 100 may find particular applicability in machines operating in environments characterized by high levels of airborne dust, dirt, particulates, and other known debris. By equipping machines with filter system 100 of the present disclosure, damage to various components of such machines may be reduced and the operational efficiency of such machines may be improved based on the filtering and capability of replacing filter elements of the filter system 100.

With reference to FIGS. 1-4, intake air 119 may enter the interior of housing 101 of filter system 100 through air inlet 115. For example, the compressor of the internal combustion engine may provide a vacuum effect such that intake air 119 is sucked through air inlet 115 and is directed towards the interior of housing 101. After intake air 119 passes through the air inlet 115, intake air 119 contacts filter elements 111 and 113 arranged along longitudinal centerline 129 of housing 101. Proximal bases 205 and 207 of the filter elements are precisely sealed with flange 201 to prevent air leakage. Filter elements 111 and 113 may filter any particulates from intake air 119 and then intake air 119 may be directed out of housing 101 through air outlet 117. Accordingly, particulates may be filtered out of the interior of housing 101 when the intake air reaches air outlet 117.

In one instance, proximal bases 205 and 207 of filter elements 111 and 113, respectively, are shaped to couple directly to the same flange 201. The coupling of these proximal bases 205, 207 to the flange 201 facilitates a simple press fit connection. For example, filter elements 111 and 113 may be inserted along arrows 250 (FIG. 3) within housing 101 from the opening of the second end wall 109. The bases of these filter elements are then sealed to flange 201 with minimal force, e.g., coupling surface 236 of the proximal base 205 is sealed to the external sidewall of flange 201, and coupling surface 245 of the proximal base 207 is sealed to the internal sidewall of flange 201. The coupling provides for a snap-fit that can provide a physical sensation and/or audible sensation indicating a proper coupling of the filter elements 111, 113 on filter housing 101.

The filter system 100 of the present disclosure may provide a larger sealing surface for the filter elements and the housing. One or more embodiments of this disclosure may prevent a mixture of air that flows through the center of first filter element 111 and air that flows around second filter element 113. One or more embodiments of this disclosure may facilitate a sturdy coupling that helps prevent displacement of filter elements during engine operation. One or more embodiments of this disclosure may provide accurate sealing of the filters elements to the housing with minimal compressive forces. One or more embodiments of this disclosure may provide a single flange for coupling a plurality of filter elements, thereby making the coupling process less complicated.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A filter system, comprising:
a housing having an inlet, an outlet, a first end, a second end, a sidewall extending between the first end and the second end, a longitudinal centerline, and at least one flange extending inside the housing; and
a plurality of filter elements located inside the housing, the plurality of filter elements each including an end shaped to couple directly to the at least one flange,
wherein the at least one flange is a single annular flange, and
wherein the single annular flange is C-shaped.

2. The filter system according to claim 1, wherein the end of each of the plurality of filter elements are shaped to provide a snap-fit coupling with the at least one flange.

3. The filter system according to claim 1, wherein the ends of the plurality of filter elements are located on opposite sides of the at least one flange.

4. The filter system according to claim 1, wherein the ends of the plurality of filter elements are coextensive in a proximal-distal direction.

5. The filter system according to claim 1, wherein the C-shaped flange is concave with respect to the longitudinal centerline of the housing.

6. The filter system according to claim 1, wherein the at least one flange is attached at the first end of the housing and is located adjacent to the outlet of the housing.

7. The filter system according to claim 1, wherein the plurality of filter elements include a first filter element and a second filter element, and wherein the ends of the first and second filter elements have complementary shapes to the at least one flange.

8. The filter system according to claim 7, wherein the complementary shapes include a concave shape on the first filter element and a convex shape on the second filter element, as viewed from the longitudinal centerline of the housing.

9. The filter system according to claim 1, wherein a portion of the housing is removable, and the plurality of filter elements are replaceable via the removable portion of the housing.

10. A filter assembly comprising:
a first filter element having a first outlet end including a first opening;
a second filter element having a second outlet end including a second opening; and
the first and second outlet ends of the first and second filter elements include coupling surfaces having complementary shapes,
wherein the complementary shapes are located about the first opening of the first filter element, and located on a radially outer surface of the second outlet end of the second filter element, wherein at least one of the complementary shapes is a C-shape.

11. The filter assembly according to claim 10, wherein the first and second filter elements are cylindrical, and the first filter element is sized to be located within the second filter element.

12. The filter assembly according to claim 11, wherein the first outlet end of the first filter element is sized to be received within the second opening of the second filter element.

13. A filter assembly comprising:
a first cylindrical filter element having a first outlet end including a first opening;
a second cylindrical filter element having a second outlet end including a second opening,
wherein the first cylindrical filter element is sized to be located within the second cylindrical filter element; and
the first and second outlet ends of the first and second cylindrical filter elements include coupling surfaces having complementary C-shapes,
wherein the complementary C-shapes are located about a radially inner surface of the first opening of the first cylindrical filter element, and located on a radially outer surface of the second outlet end of the second cylindrical filter element.

14. The filter assembly according to claim 13, wherein the coupling surfaces are configured to receive a single annular flange therebetween.

15. The filter assembly according to claim 14, wherein the coupling surfaces are configured to provide a snap-fit connection with the single annular flange.

16. The filter assembly according to claim 13, wherein the first cylindrical filter element and the second cylindrical filter element each include end walls opposite their respective outlet ends.

* * * * *